Figure 1:
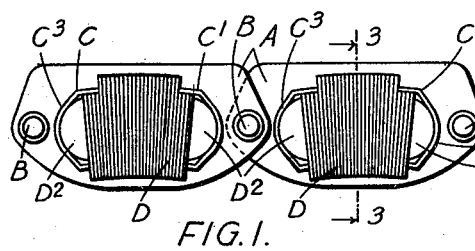

July 14, 1931.　　　G. J. ABBOTT　　　1,814,883

POWER TRANSMISSION MECHANISM

Filed Sept. 9, 1930

INVENTOR
Geoffrey Joseph Abbott,
By
Watson, Cot, Morse & Grindle
Attys

Patented July 14, 1931

1,814,883

UNITED STATES PATENT OFFICE

GEOFFREY JOSEPH ABBOTT, OF LONDON, ENGLAND, ASSIGNOR TO P. I. V. CHAIN GEARS LIMITED, OF LONDON, ENGLAND, A COMPANY OF GREAT BRITAIN

POWER TRANSMISSION MECHANISM

Application filed September 9, 1930, Serial No. 480,891, and in Great Britain September 21, 1929.

This invention relates to power transmission members for use with transmission mechanism employing expanding pulleys of the kind described in the specifications of Letters Patent of the United States of America Nos. 1,601,662 and 1,601,663, such transmission members comprising a slotted support preferably in the form of a chain built up from a series of slotted links, and a pack or group of plates disposed directly or within a sheath in each slot so as to be capable of moving across but not along the support so that any two or more of these plates may form a compound tooth to engage a depression in the pulley and provide a driving connection therewith.

In such transmission members as hitherto made the plates at the ends of each pack or group have been provided with semi-cylindrical bearing surfaces engaging with corresponding semi-cylindrical bearing surfaces at the ends of the slots or sheaths so as to permit to the plates within the slot or sheath a limited rocking movement about axes transverse to the length of the chain or the like. With such an arrangement, however, if the depth of the plates, measured in a radial direction, with respect to the pulley or pulleys with which they engage, is increased so as to increase the wearing surface of each plate which makes contact with the pulley, the semi-cylindrical end plates occupy an undesirably large proportion of the length of the slot so that there is a correspondingly small space available to accommodate the remaining plates. Thus the advantage of the larger wearing surface obtained on each plate by increasing its depth is reduced or eliminated by the reduction in the number of plates which can be accommodated in each slot.

According to the present invention instead of the curved bearing surface at the end of each slot or sheath which is engaged by the corresponding curved bearing surface of the plate at the adjacent end of the pack being formed semi-cylindrical as hitherto, it is formed part-cylindrical but subtends an angle of less than 180° and is bounded by tangential portions connecting it to the longitudinal walls of the slot or sheath. Preferably the part-cylindrical bearing surface of the plate at each end of a pack also subtends an angle which is less than 180° but is somewhat larger than the angle subtended by the corresponding part-cylindrical bearing surface at the end of the slot or sheath with which it engages.

With such an arrangement it is possible to employ plates of greater depth than hitherto without the plates at the ends of the pack being of such cross-section as to reduce undesirably the effective plate-containing length of the slot or sheath and hence the number of plates of a given thickness which it will accommodate. Thus it is possible to increase the bearing surface of the plates as a whole to a substantial extent.

Figure 3:
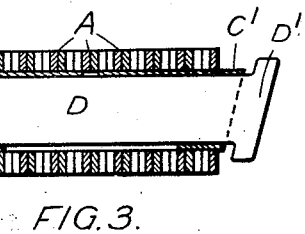
Figure 2:
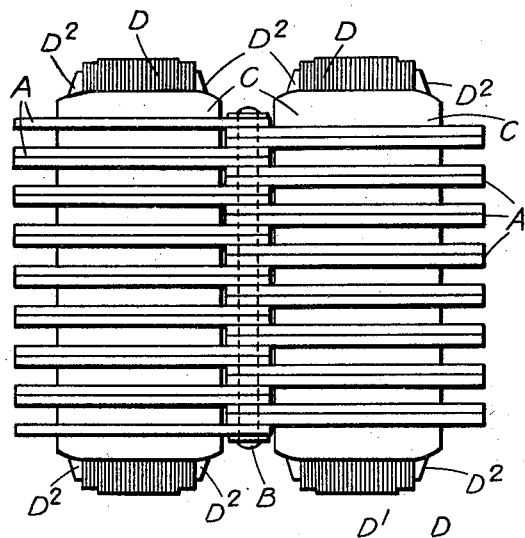
Figure 4:
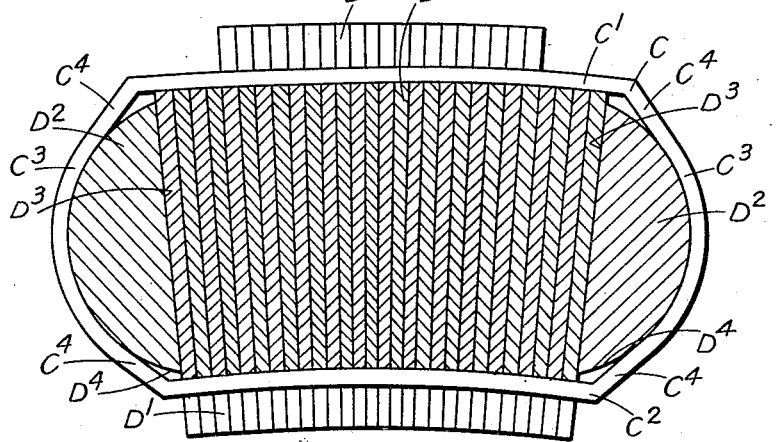

The invention may be applied to constructions in which each pack or group of plates is mounted either directly or within a sheath in a slot in a rigid ring but is particularly applicable to transmission chains as described in the specification of Letters Patent of the United States of America No. 1,601,-663 in which each link is slotted transversely to receive a removable sheet metal sheath containing a pack of transversely movable plates, the ends of which extend through the open sides of the sheath, and one construction according to the present invention as applied to such a chain is illustrated by way of example in the accompanying drawings, in which Figure 1 is a side elevation, Figure 2 is a plan of the construction shown in Figure 1, Figure 3 is a section on the line 3—3 of Figure 1, and Figure 4 is a longitudinal section on an enlarged scale through one group of plates and the casing or sheath in which they are mounted.

In the construction illustrated the chain comprises a series of links each constituted by a number of spaced parallel link elements A and connected to the link elements constituting the adjacent links by pivot pins B. The elements constituting each link are slotted transversely to receive a sheath or casing C which, viewed in side elevation, is of flattened tubular form, the upper and lower walls $C^1$, $C^2$ being of somewhat arcuate form so as to conform approximately to the mean radius of the pulleys in conjunction with which the chain is intended for use. The end walls of each sheath, viewed in side elevation, each comprise a part-cylindrical centre portion $C^3$ subtending an angle of less than 180°, for example between 90° and 140°, and connected to the ends of the upper and lower walls $C^1$, $C^2$ by substantially straight tangential portions $C^4$. Disposed within each sheath is a series or pack or plates or slats D each capable of individual transverse sliding movement in a direction at right angles to the length of the chain, each plate being provided at its ends with portions $D^1$ of greater depth than the intermediate part which lies within the sheath, the ends of the slats being inclined as shown to engage with the inclined surfaces of the pulleys with which the chain is intended to be used.

The slats D are mounted between two end plates $D^2$ which are of somewhat less depth than the slats D and are each of segmental cross-section. The flat surface $D^3$, constituting the chord of the segment, engages the face of the adjacent slat while the curved part-cylindrical surface $D^4$ which constitutes the arc of the segment and engages the part-cylindrical portion $C^3$ of the end wall of the sheath C, subtends an angle which is less than 180° but somewhat greater than the angle subtended by the part-cylindrical surface $C^3$.

It will be seen that with this arrangement a limited rocking movement about axes transverse to the length of the chain is permitted to the plates $D^2$ and the slats between them, and that the portions of these slats which lie within the sheath can yet be made of considerable depth measured radially with respect to the pulleys over which they pass without unduly reducing the number of plates of a given thickness which can be accommodated within a sheath of a given length measured in the direction of the length of the chain.

What I claim as my invention and desire to secure by Letters Patent is:—

1. For use with a variable speed gear having driving and driven members one of which comprises an expanding pulley having projections and depressions formed on the opposite driving flanges thereof, a transmission member including in combination a slotted support, a group of plates disposed in each slot so as to be capable of independent sliding movement transversely of the slot and to project laterally from either side thereof to form driving teeth of variable pitch each consisting of at least two mutually supporting plates, a part-cylindrical bearing surface at each end of the slot and a plate at each end of the group of plates having a corresponding part-cylindrical bearing surface engaging the part-cylindrical bearing surface at the adjacent end of the slot, the part-cylindrical bearing surface at each end of each slot subtending an angle of less than 180° and being bounded by tangential portions connecting it to the longitudinal walls of the slot.

2. For use with a variable speed gear having driving and driven members one of which comprises an expanding pulley having projections and depressions formed on the opposite driving flanges thereof, a transmission member including in combination a slotted support, a group of plates disposed in each slot so as to be capable of independent sliding movement transversely of the side thereof to form driving teeth of variable pitch each consisting of at least two mutually supporting plates, a part-cylindrical bearing surface at the end of each slot subtending an angle of less than 180° and being bounded by tangential portions connecting it to the longitudinal walls of the slot, and a plate at each end of the group of plates having a corresponding part-cylindrical bearing surface engaging with the part-cylindrical bearing surface at the end slot and subtending an angle which is less than 180° but greater than the angle subtended by the bearing surface at the end of the slot.

3. For use with a variable speed gear having driving and driven members each comprising an expanding pulley having projections and depressions formed on the opposite driving flanges thereof, a transmission member including in combination a slotted support, a sheath in each slot, a group of plates disposed in each sheath so as to slide therein transversely of the sheath and to project laterally from each side thereof to form driving teeth of variable pitch each consisting of at least two mutually supporting plates, a part-cylindrical bearing surface subtending an angle of less than 180° formed on the end wall of each sheath and bounded by tangential portions which connect it to the longitudinal walls of the sheath, and a plate at each end of the group of plates having a corresponding part-cylindrical bearing surface engaging the part-cylindrical bearing surface at the end of the sheath.

4. For use with a variable speed gear having driving and driven members one of which comprises an expanding pulley having projections and depressions formed on the opposite driving flanges thereof, a transmission member including in combination a slotted support, a sheath in each slot, a group of plates disposed in each sheath so as to slide therein transversely of the sheath and to project laterally from each side thereof to form driving teeth of variable pitch each consisting of at least two mutually supporting plates, a part-cylindrical bearing surface subtending an angle of less than 180° formed on the end wall of each sheath and bounded by tangential portions which connect it to the longitudinal walls of the sheath, and a plate at each end of the group of plates having a corresponding part-cylindrical bearing surface which engages the part-cylindrical bearing surface at the end of the sheath and subtends an angle which is less than 180° but greater than the angle subtended by the part-cylindrical bearing surface at the end of the sheath.

5. A power transmission chain comprising a series of links each built up from a plurality of link elements each having a slot and arranged parallel to one another, pivots connecting each link, a sheath mounted within the slots in each complete link, a group of plates mounted in each sheath so as to slide therein independently of one another across the length of the chain to form laterally projecting teeth of variable pitch, each tooth being formed from a plurality of mutually supporting sliding plates, a part-cylindrical bearing surface in the end wall of each sheath subtending an angle of less than 180° and a plate at the end of each group having a corresponding part-cylindrical bearing surface which engages with the part-cylindrical bearing surface at the end of the sheath.

6. A power transmissioin chain comprising a series of links each built up from a plurality of link elements each having a slot and arranged parallel to one another, pivots connecting each link, a sheath mounted within the slots in each complete link, a group of plates mounted in each sheath so as to slide therein independently of one another across the length of the chain to form laterally projecting teeth of variable pitch, each tooth being formed from a plurality of mutually supporting sliding plates, a part-cylindrical bearing surface in the end wall of each sheath subtending an angle of less than 180°, and a plate at each end of each group having a corresponding part-cylindrical bearing surface which engages with the part-cylindrical bearing surface at the end of the sheath and subtends an angle which is less than 180° but greater than the angle subtended by the part-cylindrical bearing surface at the end of the sheath.

7. For use with a slotted support adapted to form part of a variable speed gear comprising an expanding pulley having projections and depressions formed on the opposite driving flanges thereof, a sheath formed so as to engage a slot in the slotted support and having each end formed as a part-cylindrical bearing surface subtending an angle of less than 180° and bounded by tangential portions connecting it to the longitudinal walls of the sheath, such sheath being adapted to contain a group of plates which can slide therein independently of one another and to form laterally projecting teeth of variable pitch, the end plates of each group having corresponding part-cylindrical bearing surfaces engaging the part-cylindrical bearing surfaces at the ends of the sheath.

In testimony whereof I have signed my name to this specification.

GEOFFREY JOSEPH ABBOTT.